US005471254A

United States Patent [19]

Claassen

[11] Patent Number: 5,471,254

[45] Date of Patent: Nov. 28, 1995

[54] REMOTE CONTROL UNIT WITH TILTABLE COVER HAVING DISPLAYING INFORMATION THEREON

[75] Inventor: Henning Claassen, Lüneburg, Germany

[73] Assignee: Chemcoat, Inc., Peachtree City, Ga.

[21] Appl. No.: 371,603

[22] Filed: Jan. 12, 1995

Related U.S. Application Data

[63] Continuation of Ser. No. 106,984, Aug. 16, 1993, abandoned.

[30] Foreign Application Priority Data

Mar. 5, 1993 [DE] Germany ............................ 9303260 U

[51] Int. Cl.[6] ...................................................... H04N 5/44

[52] U.S. Cl. ............................................................ 348/734

[58] Field of Search .................................... 348/211, 273, 348/372, 375, 376, 212, 213, 214, 734, 844; 455/352–355;D14/124, 125, 174, 193, 218

[56] References Cited

U.S. PATENT DOCUMENTS

| | | | |
|---|---|---|---|
| 4,745,397 | 5/1988 | Lagerbauer et al. | 348/734 |
| 4,855,725 | 8/1989 | Fernandez | 348/734 |
| 4,878,055 | 10/1989 | Kasahara | 348/734 |
| 5,181,024 | 1/1993 | Tsunoda et al. | 348/734 |

FOREIGN PATENT DOCUMENTS

| | | | |
|---|---|---|---|
| 3446806 | 6/1986 | Germany . | |
| 3713428 | 3/1988 | Germany . | |
| 9205965 | 8/1992 | Germany . | |
| 2153574 | 8/1985 | United Kingdom | G09F 7/10 |

*Primary Examiner*—Joseph Mancuso
*Assistant Examiner*—Bipin Shalwala
*Attorney, Agent, or Firm*—Armstrong, Westerman, Hattori, McLeLand and Naughton

[57] ABSTRACT

This invention relates to a remote control device for video/audio apparatuses comprising a casing having operational controls for actuating functions of the video/audio apparatuses, electrical or electronic, respectively, circuits for giving operational signals to the video/audio apparatuses, a tiltable lid mounted movably to the casing, which lid covers at least some essential operational controls in one end position and exposes the covered operational controls in the other end position, and at least one assembly formed at the lid to accommodate an exchangeable information carrier.

19 Claims, 3 Drawing Sheets

FIG.4
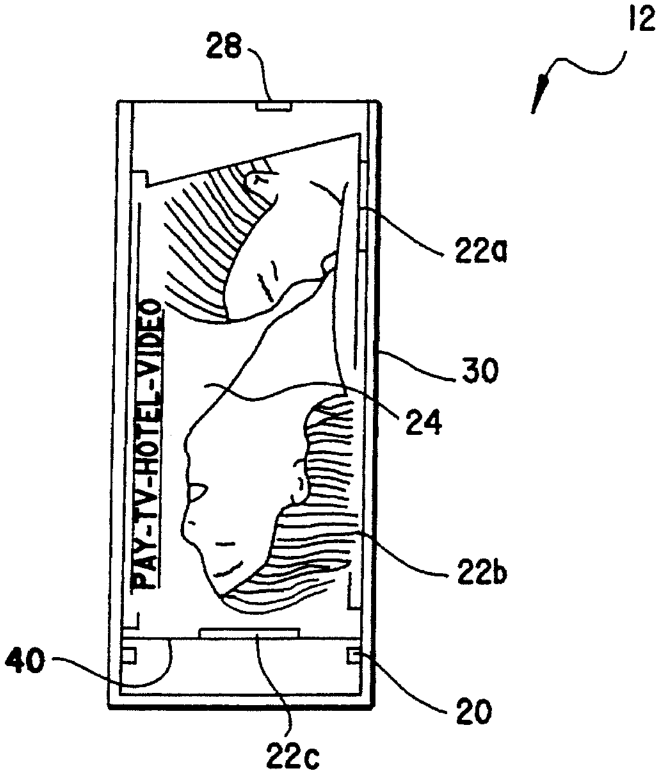
FIG.5
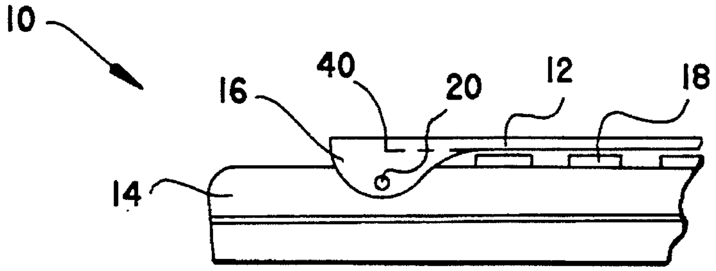
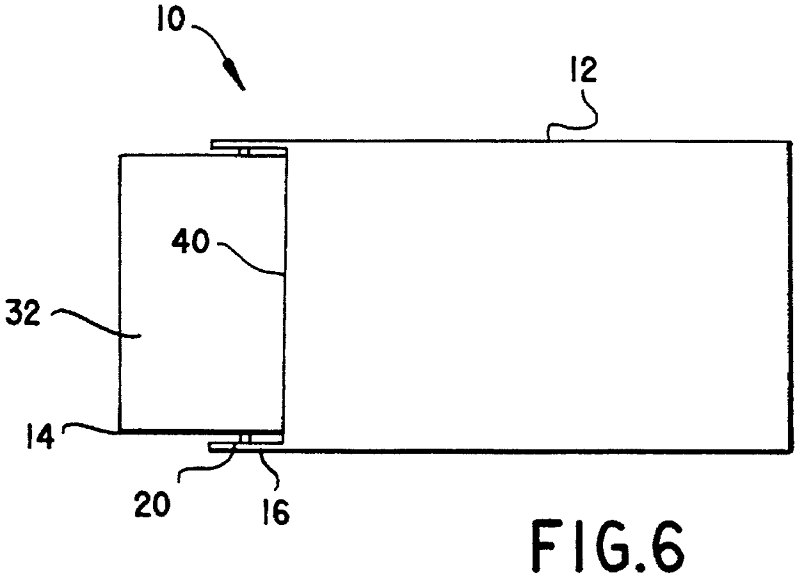
FIG.6

REMOTE CONTROL UNIT WITH TILTABLE COVER HAVING DISPLAYING INFORMATION THEREON

This application is a continuation of application Ser. No. 08/106,984, filed Aug. 16, 1993, now abandoned.

BACKGROUND OF THE INVENTION

1. Field of the Invention

The present invention relates to a remote control device for video/audio apparatuses; it primarily concerns TV sets so that only this particular application will be referred to, namely both for commercial purposes, for example the so-called "Pay TV Systems", i.e. for the reception of paid programs, in hotels, and for private purposes, i.e. the TV reception of all privately accessible broadcasting stations, for example in private and holiday apartments, hospitals etc.

Especially in the closed circuit systems of hotels, hospitals, holiday apartments etc. which are equipped with a centralised antenna device supplying a large number of TV receivers, this network also provides services. Such services comprise information, additional programs, video text information etc. It has proven profitable to broadcast cinema movies such as drama movies, adventure movies, cartoons or erotic movies via one or several programs of the local antenna networks of hotels.

Since hotel guests are not used to having additional programs provided at home, the relevant information opportunities must be presented in a way which is easy to recognise.

2. Description of the prior art

So far, it was customary to place so-called program display cards for Pay TV or hotel video in the hotel rooms. Since these displays must be sufficiently large in size to attract the attention of the guest on the one hand, but must not take up valuable space in the hotel room on the other, they are usually placed on top of the TV set as the reference point, i.e. 3 to 4 meters from the top of the bed. As a result, the guest cannot read the display or does not notice it among other advertising displays of the hotel. In addition, the information cards were often misplaced by the cleaning staff, knocked over by drafts or made unreadable in another way.

In the private sector, a number of stations accessible to everybody can be received without the additional Pay TV programs. When a TV set is sold to a private household or installed in hospitals or holiday apartments all the stations must be programmed locally. The number can amount to 30 stations or more which are received via cable. For the average viewer it is very difficult or even impossible to remember the channel allocations of the individual stations. In the past, this problem was solved, for example, by sticking a list of stations to the back of the remote control device. Since this device was fully exposed, it became quickly soiled and easily damaged. In hospitals or holiday apartments it is often illegible or is not even noticed, because sufficient space is only provided on the bottom part.

Even though remote controls, telephones etc. are already provided with tiltable or slidable lids to cover operational controls which, not being intended for daily use, are to be kept out of sight of the user, such lids are not suitable to accommodate exchangeable information or lists of stations. They are intentionally placed out of sight, are not meant to be discovered by the occasional user and need not be opened for switching on and using the TV set for its regular purpose.

Furthermore, it is often necessary in hotels, hospitals etc. to draw the attention of the guests to special features, for example breakfast times, animation programs, cosmetic treatments, opening hours of hospital shops and such like. The use of remote control devices is also a good choice here, because these, in connection not only with the TV set, but also with video recorders, CD players and cassette tape decks, are often at the center of interest.

It is the purpose of the present invention to provide a device for the remote control of video/audio apparatuses, especially TV sets, which overcomes the above-mentioned disadvantages and uses said device as an information or advertising vehicle.

This object is solved by a remote control device for video/audio apparatuses comprising a casing, operational controls for actuating functions of the video/audio apparatuses, electrical or electronic, respectively, circuits for giving operational signals to the video/audio apparatuses, a tilted lid mounted movably to the casing, which lid covers at least some essential operational controls in one end position and exposes the covered operational controls in the other end position, and at least one assembly formed at the lid to accommodate an exchangeable information carrier.

Suitable embodiments of the device according to the invention are defined by the features set forth in the subclaims.

The advantages provided by the invention are based on the design of the remote control device as a carrier of information which the TV viewer cannot but notice when switching on the corresponding TV set. This is because, in its normal position, the tiltable lid covers not only insignificant operational controls but also, at least in part, essential operational controls, namely those necessary for switching on and/or adjusting the set (selection of stations, volume), so that, primarily, only the outer face of the lid is visible together with the information provided thereupon, e.g. a direct reference to a Pay TV program or a certain station. Thus, if the user picks up the remote control device to switch on the TV set, he cannot fail to notice the advertising message. When he tilts the lid in order to expose the essential operational controls, additional information, e.g. a sample photograph, a Pay TV program, a list of stations or a weekly program schedule, will appear on the previously invisible inside of the lid, exactly in the visual angle above the operational control keys of the device.

Tests have shown that this double exposure to information, particularly in the case of new stations and Pay TV programs, surprisingly results when the TV set is switched on in the regular manner in much higher viewer or switch-on ratings than could be achieved with the pointers used so far, e.g. display boards.

At the same time, the operational controls of the remote control device, generally keys, are protected against dirt, for example dust, by the tiltable lid.

In addition to information on Pay TV programs, additional information could be provided on the inner or outer surface of the lid, for example advertising for beverages, tobacco products, food and luxury items and such like.

Even though it is possible in principle to attach the relevant information surfaces firmly to the lid, in a preferred embodiment the lid is equipped with a holding device for information cards that can be exchanged easily. This provides an opportunity to refer to new Pay TV programs in continuous, e.g. weekly, succession.

The holding device for the information card may be arranged on the inner and/or the outer surface of the lid.

Thus a maximum of two information cards can be accommodated if both the inner and the outer surface of the lid are to be used as information carriers.

A particularly simple and therefore advantageous embodiment is provided if the tiltable lid is made, at least in part, of a transparent material, preferably a transparent synthetic material; in this case, the information card can be mounted on the inside of the lid and provided with information on both sides; the information on the one side will then be visible from the outside through the transparent lid, whereas the information on the other side only becomes visible when the lid is tilted. That way a variety of information can be provided in a simple manner, namely by using only one information card, and easily exchanged whenever necessary.

The easy exchange of the information card becomes especially advantageous if it is guided along slits or rails provided along the edges of the lid.

At the same time, both information surfaces of the information card are largely protected against damage, but also against soiling, namely one of the surfaces at all times by the transparent lid and the other at least when the lid is closed, if the information card is positioned between the lid and the operational panel of the remote control device and is thus covered.

Even though the information card can basically be inserted into the lid or the rails of the lid from every direction, it is preferred to insert the information card into the lid from the side averted from the surface of the remote control while the lid is in the tilted position.

It has turned out to be useful if the lid remains in the opened position, i.e. if it can be moved from this open position only if a certain force is used or if the remote control device is brought into an oblique position. In this locked position, the lid and thus also the information surface on its inside should be at a 60°–200° angle to the operational panel of the casing; this angle ensures good legibility of the information after the lid has been opened and at the same time operability of the operational controls. An angle between 90° C. and 150° between the operational panel of the casing and the lid is especially useful.

By means of a simple mounting mechanism, such a lid can also be mounted onto existing remote control devices at a later point in time, so that they can be "upgraded".

Advantageously, the information carrier is comprised of a sheet element, especially of cardboard, carton, plastic or paper; the material should take print well so that, for example, new information carriers can be printed weekly.

According to a preferred embodiment, the hinged lid can be arranged tiltably on the casing of the remote control device by means of a hinge-like holding device. For this purpose, holes or projecting parts can be provided on opposite sides of the casing which find their counterparts in the hinged lid and interlock under bias or formfittingly, thus providing a firm yet tiltable hold of the hinged lid on the casing of the remote control device.

The sheet-like information carrier is advantageously held by at least two holding devices, preferably at least two projecting parts on the side of the hinged lid facing the casing, sufficient space being provided between the lid and the projecting parts so that the information card can be inserted between the lid and the projecting parts with light pressure.

In order to provide the projecting parts with guiding characteristics, the projecting parts can extend in the longitudinal direction of the lid so that a kind of slit guidance for the card is provided on both sides. An additional projecting support can be positioned at the end of the insert canal. In order to prevent the card from slipping out accidentally, a stop element can be positioned at that end of the lid from which the card is slipped, and helps prevent the card from slipping out accidentally.

In order to prevent the hinged lid from accidentally being lifted off the casing of the remote control device, thus presenting, for example, a surface which can be broken off if a large force is applied, at least one clamp or stop element or such like may be positioned on the lid and/or the casing which holds the lid with slight holding force so that the user does not encounter any significant resistance when wishing to use the remote control device according to the invention, whereas any unintentional tilting of the lid of the remote control device is prevented.

BRIEF DESCRIPTION OF THE DRAWINGS

In the following, the present invention will be illustrated in greater detail with reference to the accompanying figures, disclosing additional advantages and features.

FIG. 4 shows an inside view of a lid or a top view of a transparent lid, respectively, for a device according to the present invention;

FIG. 5 shows a section of the front part of a device according to the present invention;

FIG. 6 shows a bottom view of a device according to the invention with the lid closed.

DESCRIPTION OF THE PREFERRED EMBODIMENTS

Figure 1:
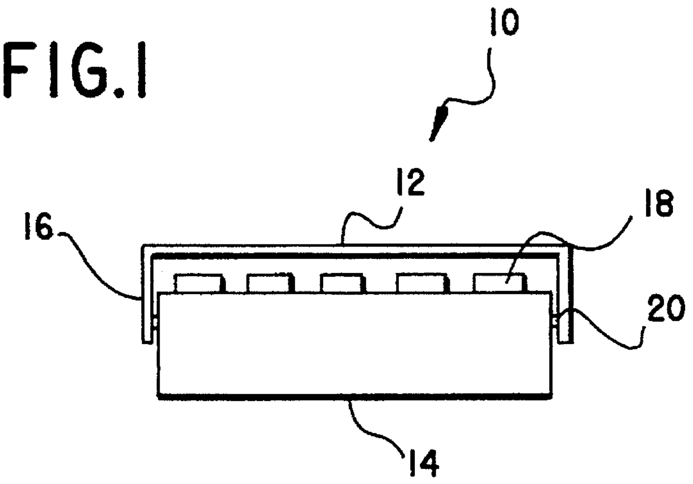
FIG. 1 shows a front view of a device according to the present invention.

The remote control device 10 according to the invention has a tiltable lid 12 which is held by hinge-like holding means 20 on a casing 14 of said remote control device 10. Said hinge-like holding means 20 are positioned on extensions 16 extending vertically to the main surface of said lid 12. Operational controls 18, namely keys, are covered by said lid 12 in the position shown in FIG. 1.

It goes without saying that the remote control device 10 according to the invention also comprises all the other elements customary for state-of-the-art remote control devices, e.g. a source of energy, preferably in the form of a battery, a circuit by which the operational controls 18 can give impulses to a transmitter element as well as the transmitter element itself which transmits control instructions in the form of infrared rays, ultrasound waves, microwaves or such like to a receiver positioned in the relevant video/audio apparatus which then activates the apparatus, especially a TV set, but also a video recorder etc., according to the wishes of the user.

The extensions 20 visible in FIG. 1 can be positioned both on the lid 12 and the casing 14, but must always find their counterpart in the relevant other part.

Figure 2:
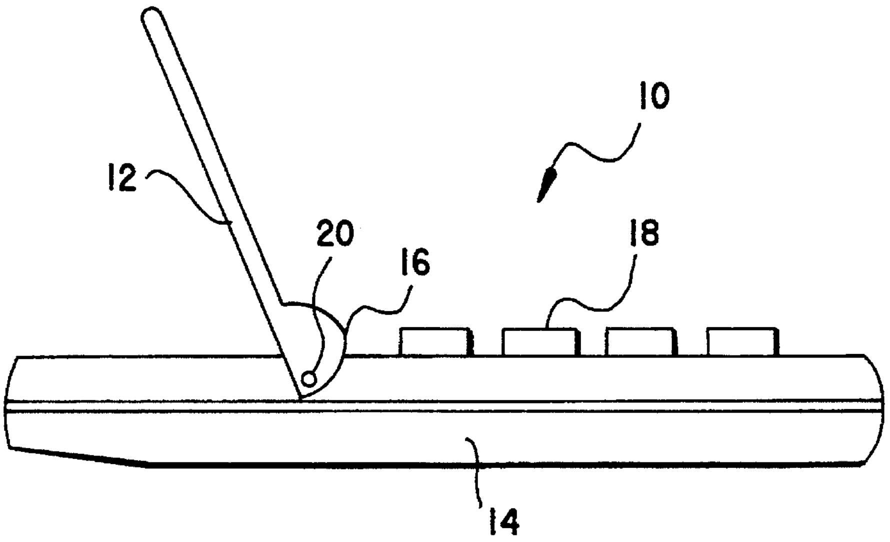
FIG. 2 shows a side view of a device according to the present invention with the lid tilted up.

FIG. 2 shows the device according to the invention with the lid 12 uncovering the operational controls 18. Said lid 12 is tilted up or opened, it being possible to limit the tilting movement connected therewith, for example by positioning a control curve having an end position on the vertical extension 16, or by a cutout on said lid 12 which prevents any further tilting movement. As a result, said lid 12 is held in the position shown in FIG. 1 so that its inner surface is well visible. In this position, the angle between the control panel of the casing 14 and the lid 12 is about 110°. This angle may vary between 60° C. and 200°, especially between 90° and 150°.

Figure 3:
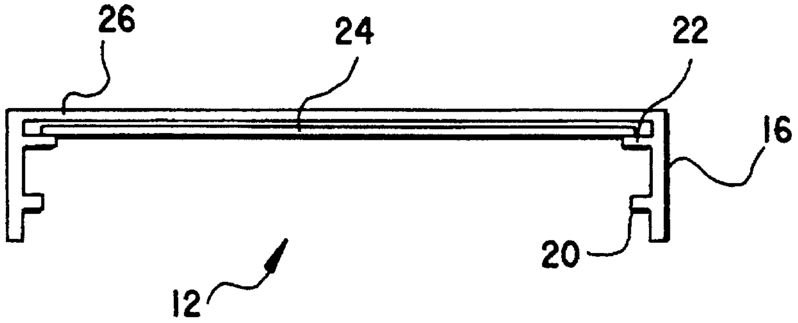
FIG. 3 shows a sectional view through a hinged lid with a slit guidance for the information card.
Figure 7:
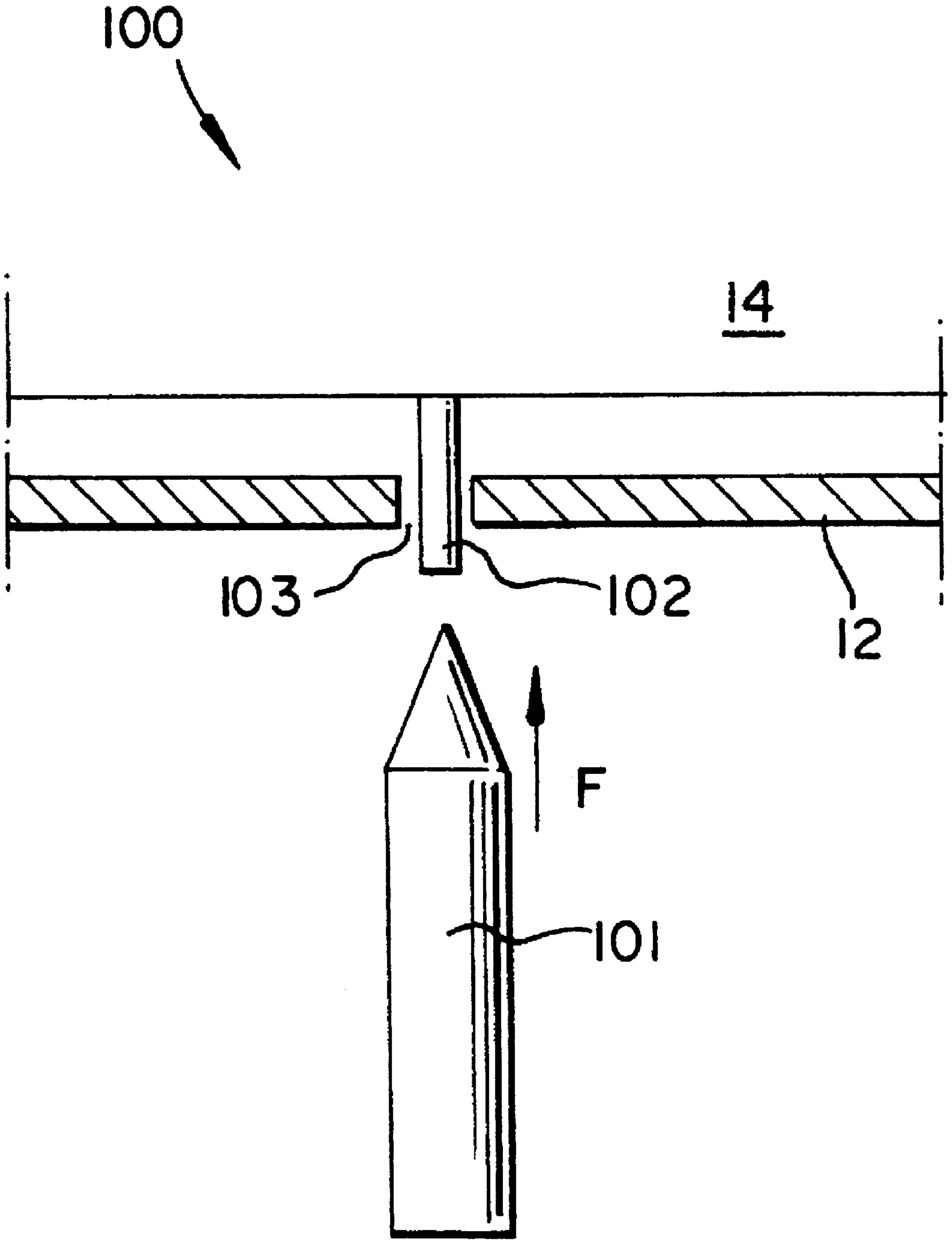
FIG. 7 shows a locking mechanism for the lid.

The lid 12 can, for example, be shaped as shown in FIG. 3. Under the surface 26 of said lid 12, an information card 24 is held by projecting parts 22. The vertical extensions 16 comprise sections 20 which engage with the casing 14 of the device 10, thus combining to act as a hinge-like hold. Said information card 24 can, for example, be made of paper, carton, synthetic material or any other sheet material. At least parts of said surface 26 of said lid 12 consist of a transparent synthetic material. As an alternative, said surface 26 of said lid 12 may also comprise a cut-out part; in both cases, the back of said information card 24 is easily visible for the viewer from outside, whereas the other surface only becomes visible when the lid is tilted.

FIG. 4 shows a lid 12 which also comprises hinge parts 20 by which said lid 12 is tiltably connected with the casing 14 of the remote control device 10. At least two, in the present embodiment three, projecting support or guiding parts **22*a*, 22*b*, 22*c* are provided on the lateral sections of said lid 12. The information card 24 is visible with the illustrated advertising surface in the closed position, i.e. from the outside, through a cut-out part in the lid 12 or through a transparent part of said lid 12. The inner surface of said information card 24 is only accessible when the lid has been tilted into the position according to FIG. 2. A stop element or clamp part 28 is provided at the beginning of the slip-in canal for the carrier 24 to prevent said card 24 from accidentally falling out of said lid 12**.

In the present embodiment according to FIG. 4, the surface of the lid 12 ends with the marginal part 40, whereupon there is provided, for example, an additional guide or an additional support **22*c* for the card 24. By positioning said end section 40, the tilting movement of said lid 12 can be limited and, as shown in FIG. 2 for example, the release position of said lid 12 can be adjusted. The holding or guiding sections 22*a*, 22*b*, 22*c*** may, of course, also be positioned in the form of a continuous frame.

FIG. 5 once again shows especially the hinge section of a remote control device 10 according to the invention. The hinge section 20 provides tiltability, whereas the end section 40 on the surface of the lid restricts the tilting movement so that the lid 12 cannot be tilted too far and the information card 24 is positioned especially favourably into the free visual angle, thus attracting the interest of the user. The position of said lid 12 according to FIG. 5 also ensures that the operational controls do not become soiled or dusty.

Finally, FIG. 6 shows a device 10 according to the invention with the lid 12 closed, viewed from below.

Which operational controls are "essential" within the meaning of the invention and are therefore covered when the lid is closed depends on the relevant application. As a rule, in the case of hotels with Pay TV systems at least those operational controls are covered which are necessary for the regular operation of the pertinent TV set, i.e. especially ON and OFF switch, volume, selection of free channels and selection of Pay TV channels.

As an alternative, it is useful in certain cases to design the lid 12 in such a way that only certain selected operational controls are covered so that it is possible to select the ON and OFF switch and/or certain TV channels, e.g. ARD*) and ZDF*), without opening the lid 12.

*) ARD and ZDF are the two main national stations in Germany.

This alternative is also useful for the private sector so that the lid 12 need not be adjusted whenever the TV set is switched on in a regular manner to the usual stations such as ARD and ZDF.

In this case, the lid would only be opened if the list of stations on the inside, namely on the inner surface of the information card, is required, i.e. for programs which are not watched all the time.

If the lid 12 in the closed position covers the ON and OFF switch of the remote control device, it may be useful to provide said lid 12 with a lock, thus making it childproof. This lock 100 can be overcome by means of a pointed object 101, e.g. a pencil or ballpoint pen, with a certain force F which small children do not have. Said lock is usefully integrated into the tilting mechanism for the lid 12 and may be formed by a pin 102 on the casing which extends into an opening 103 of the lid. By means of a pencil, said pin can be pushed from the opening, allowing the lid 12 to be opened. Kinematic reversal is also possible.

I claim:

1. A remote control device for a video/audio apparatus, comprising:

a casing;

electric circuit means, within said casing, for sending operational signals to the video/audio apparatus;

operational controls, on a top surface of said casing and connected to said electric circuit means, for providing actuating functions of the video/audio apparatus;

a tiltable lid movably mounted to the casing, said lid being movable to a closed position covering at least one essential operation control wherein said lid is covering said top surface of said casing and being movable to an open position wherein the lid exposes the at least one essential operation control and in which said lid is moved away from said top surface of said casing;

an information card capable of being removably held on said lid such that said information card is completely removable and replaceable with a separate information card;

said lid being equipped with holding means to removably hold the information card such that said information card is completely removable from said remote control device and replaceable with a separate information card;

wherein the information card has an illustration at least on its inner surface facing the control elements whereby in said closing position said lid and said information card obstructs the view of said at least one essential operational control and in said open position said at least one essential operation control is exposed and said inner surface of said card having said illustration is also exposed for viewing by a user.

2. The device according to claim 1, wherein the lid is tiltably mounted to the casing by at least one hinge-like holding means.

3. The device according to claim 2, wherein the lid is eccentrically attached by the hinge-like holding means such that said lid remains upright in the open position uncovering the operational controls.

4. The device according to claim 1, wherein at least one stop element is positioned on the lid and/or the casing, which at least one stop element reversibly holds said lid in the closed position covering the operational controls and/or in the open position uncovering the operational controls.

5. The device according to claim 1, in which the card is a sheet of paper, carton or a synthetic material.

6. The device according to claim 1, wherein at least part of the lid consists of a transparent material.

7. The device according to claim 6, wherein the lid consists of a transparent synthetic material.

8. The device according to claim 1, wherein the card has illustrations on both sides.

9. The device according to claim 1, wherein the card is detachably held to the lid by at least one stop element.

10. The device according to claim 1, wherein the information card is held in slit guides on both edges of the lid.

11. The device according to claim 1, wherein at least two projections are provided on the side of the lid facing the casing so that the card can be inserted between the lid and the projections.

12. The device according to claim 1, wherein the angle between the top surface of the casing and the lid is between 60° and 200° when the lid is in the open position.

13. The device according to claim 1, wherein the lid is mounted by means of bores and pins forming a hinge between narrow longitudinal edges of the casing and side portions of said lid.

14. The device according to claim 1, wherein the hinge-like holding means of the lid includes childproof means which requires a tool for unlocking.

15. The device according to claim 14, wherein the childproof means includes a pin extending into an opening and movable by means of the tool.

16. The device according to claim 12, wherein the angle between the top surface of the casing and the lid is between 90° and 150° when the lid is in the open position.

17. The device according to claim 1, wherein said at least one essential operation control includes an on/off control.

18. The device according to claim 1, wherein said at least one essential operation control includes a volume control.

19. The device according to claim 1, wherein said at least one essential operation control includes a channel select control.

* * * * *